Aug. 31, 1965  G. H. THOMAS ETAL  3,203,254
ELECTRONIC BALANCING APPARATUS
Filed May 21, 1962  4 Sheets-Sheet 1

INVENTORS
GLEN H. THOMAS
CHARLES A. SHEARER
BY
Murray & Young
ATTORNEYS

FIG. 1

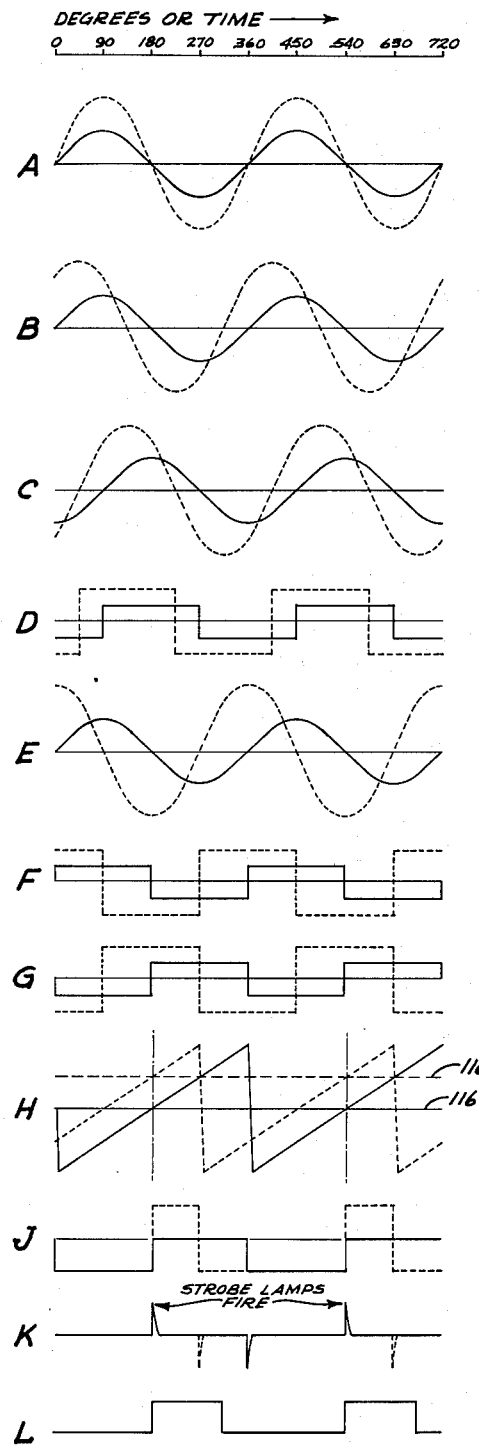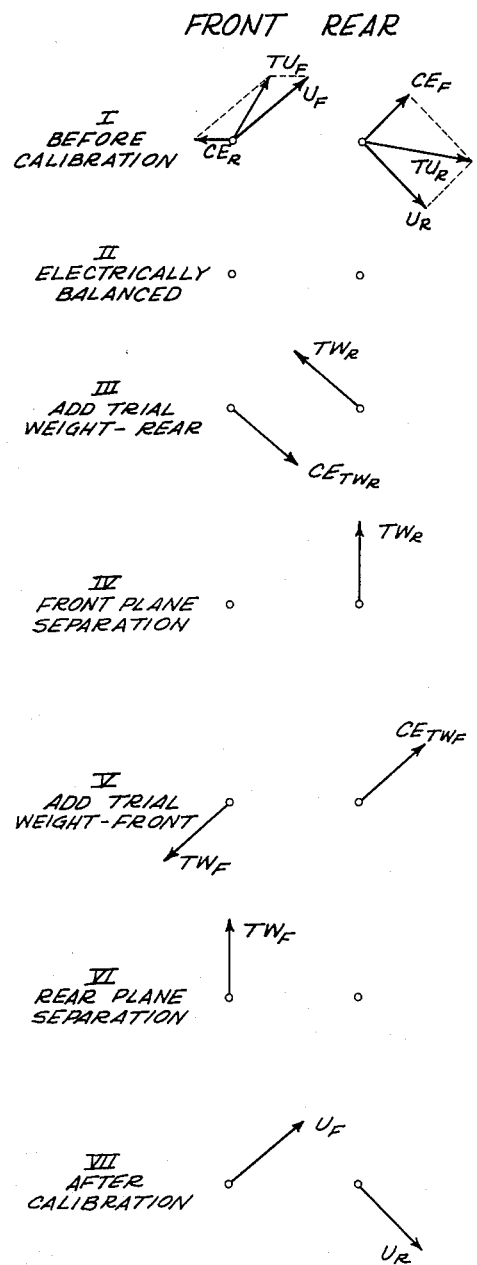
FIG. 4
FIG. 2
INVENTORS
GLEN H. THOMAS
BY CHARLES A. SHEARER
Murray & Young
ATTORNEYS

INVENTORS
GLEN H. THOMAS
BY CHARLES A. SHEARER

Murray & Young
ATTORNEYS

INVENTORS
GLEN H. THOMAS
CHARLES A. SHEARER
BY
Murray & Young
ATTORNEYS

United States Patent Office 3,203,254
Patented Aug. 31, 1965

3,203,254
ELECTRONIC BALANCING APPARATUS

Glen H. Thomas, Columbus, and Charles A. Shearer, Westerville, Ohio, assignors to International Research and Development Corporation, Worthington, Ohio, a corporation of Ohio
Filed May 21, 1962, Ser. No. 196,211
12 Claims. (Cl. 73—466)

This invention relates to dynamic balancing of rotating bodies and more particularly to improved apparatus for dynamic balancing of internal combustion engines and the like wherein the speed of the crankshaft and other moving parts cannot be accurately maintained at a fixed value.

As is known, in two plane balancing of rotating bodies, it is necessary to make some provision for the elimination of cross-effect and to provide some method of accurately calibrating the analyzing instrument. That is, it is necessary to make some provision for assuring that the unbalance in one correction plane does not enter into the unbalance indication for the other correction plane. In copending application Serial No. 83,445, filed January 18, 1961 and assigned to the assignee of the present application, a novel method and apparatus are described for balancing through electrical elimination of cross-effect. Specifically, the aforesaid application Serial No. 83,445 provides a balancing unit in which a reference generator is energized by one of the two pickups associated with the rotor under analysis, and this reference generator operates upon the signal which it receives to produce a reference signal of fixed amplitude and wave form but adjustable phase. The apparatus also includes a pair of compensator circuits capable of adjusting both the phase and amplitude of an input signal applied thereto, the output of the reference generator being connected to the compensator circuits which may be adjusted to provide signals which are utilized to simulate a balanced rotor. Once this has been accomplished, it is then possible to effect electrical plane separation and to also effect calibration of the unit in both phase and amplitude.

Although the method and apparatus shown in the aforesaid application Serial No. 83,445 is suitable for dynamic balancing of rotors and the like which rotate at a fixed speed, it cannot be effectively used for balancing internal combustion engines and other similar equipment where the speed of rotation of the crankshaft and other operating parts cannot be accurately controlled. In most dynamic balancing equipment, filters must be provided to separate a particular selected frequency from a plurality of signals of different frequencies, the reason being that it often happens that two or more sources of unbalance are present in a piece of equipment and are vibrating at different frequencies. The result is that a composite electrical signal composed of several different frequencies is produced by the vibration pickups which are in contact with the equipment being balanced. In order to balance a piece of equipment, however, it is necessary to separate a particular selected frequency component of the total vibration-responsive signal due to a single vibrating part from different frequencies, and the filters are employed for this purpose.

In the case of an internal combustion engine, there may not only be several sources of unbalance; but, in addition, the speed of rotation of the various parts of the engine cannot be accurately controlled. That is, the speed of an engine with a throttle adjustment set for 1500 revolutions per minute may actually vary from this value by, say, plus or minus ten revolutions per minute. Consequently, the frequency of the signals passing through the aforesaid filters of the balancing equipment also vary, and since a phase shift occurs in a signal of varying frequency passing through the filters, the phase of the signal used to fire the stroboscopic lamps of the balancing equipment will also vary, meaning that in the absence of some type of phase correcting means, the stroboscopic lamps cannot be used to accurately balance the equipment.

The principal objects of the invention include:

To provide two plane balancing apparatus for internal combustion engines and the like which not only electrically eliminates cross-effect, but which also compensates for the phase shift occasioned by a variable frequency vibration signal passing through the filters of the balancing apparatus.

To provide improved two plane balancing apparatus for internal combustion engines by means of which it is possible to quickly balance a large number of engines on a production basis without the need of large amounts of equipment or the necessity of a skilled operator; and To provide two plane balancing apparatus wherein two different-colored stroboscopic lamps are employed, one for each end of the rotor being balanced, the lamps being directed onto a light-colored mark on a rotating part at one end of the rotor whereby two different-colored marks will simultaneously appear on the part, each being representative of the unbalance condition at opposite ends of the rotor.

The above and other objects and features of the invention will become apparent from the following detailed description taken in connection with the accompanying drawings which form a part of this specification, and in which:

FIGURE 1 is a schematic block diagram of the balancing apparatus of the invention;

FIG. 2 comprises a hypothetical vector analysis of the calibrating procedure for the apparatus of FIG. 1;

FIGS. 3A and 3B, when placed end-to-end, comprise a detailed block diagram of the apparatus of FIG. 1 showing the specific elements of the phase correcting circuits employed therein; and FIG. 4 illustrates wave forms appearing at various points in the phase correction circuits of FIGS. 3A and 3B.

General description of two plane balancing apparatus

Referring now to the drawings, and particularly to FIG. 1, the piece of equipment being balanced is indicated as an internal combustion engine 10. Two pickups 12 and 14 are applied to the front and rear ends respectively of the engine in proximity to the main engine bearings. These bearings, it will be understood, are in the spaced planes where it is desired to determine dynamic unbalance. The front pickup 12 is connected to contacts 1, 2, 6, 7 and 8 of deck A-1 of a two deck ten position rotary selector switch A, while the rear pickup 14 is connected to contacts 3, 4 and 5 of deck A-1. The front pickup 12 is also connected to a front isolator and mixer 16 in the front channel of the unit while the rear pickup 14 is connected to a similar rear isolator and mixer 18 in the rear channel of the unit.

The movable arm 20 of deck A-1 of the selector switch A is connected to a reference generator, generally indicated by the reference numeral 22. As will hereinafter be explained, the reference generator 22 includes a limiter which insures a constant amplitude output and a phase adjusting operator adapted to vary the phase of the signal passing therethrough. From the reference generator 22, the signal is passed through a bandpass filter 30 which eliminates all frequencies other than those of a selected frequency corresponding to the vibrating part under inspection. As was explained above, the signal, in passing through the bandpass filter 30, will be shifted in phase with the result that it is necessary to pass its output through a phase correction circuit 32. The output of the phase correction circuit 32, which has a phase which is the same as that of the output of the reference generator 22, is fed via lead 33 to contacts 1–8 of deck A–2 of the selector switch A. The movable arm 34 of deck A–2 is connected to the inputs of front and rear compensator units 36 and 38, respectively, which are provided with controls 40, 42 and 44, 46, respectively, for adjusting both the amplitude and phase of signals fed thereto. It is a feature of the balancer that these controls need not be quantitatively calibrated but may consist simply of unmarked knobs. The outputs of the front and rear compensators 36 and 38 are fed to the front and rear isolators and mixers 16 and 18, respectively.

Circuits 16 and 18 are also connected to rear and front plane separator units 48 and 50 through potentiometers 52 and 54, respectively. Each separator 48 and 50 is provided with amplitude and phase controls 56, 58 and 60, 62, respectively. Again, it is a feature of the apparatus that these controls 56, 58 and 60, 62 need not be calibrated. The outputs of the front and rear separators 48 and 50 are respectively connected to the rear and front isolators and mixers 18 and 16.

The isolators and mixers 16 and 18 are further connected to front and rear calibration circuits 68 and 71. These calibration circuits are provided with amplitude and phase controls 70, 72, and 74, 76 which need no calibration.

The output of the front calibration circuit 68 is connected through a fixed frequency filter 83 to a front phase correction circuit 84 which is similar to the phase correction circuit 32. The rear calibration circuit 71 is similarly connected through a fixed frequency filter 87 to a rear phase correction circuit 88. The output of the front phase correction circuit is adapted to be connected to a front strob circuit 90 through normally closed contacts 80 of a pushbutton switch 82. This front strob circuit 90 is also adapted to be connected to the phase correction circuit 32 through normally open contacts 86 on the pushbutton switch 82. The output of front strob circuit 90 is connected to a white or front strob light 92, while an amplitude meter 96 is connected through cathode follower 94 to the output of the front filter circuit 83. In a somewhat similar manner, the output of the rear phase correction circuit 88 is connected through a rear strob circuit 98 to a second, red stroboscopic lamp 100. The filter 87 is connected to a cathode follower circuit 102 having its output connected to a second amplitude meter 104.

The isolators and mixers 16 and 18 are of such a nature that the signals fed thereto by the compensator and plane separator units do not react upon the outputs from the front and rear pickups 12 and 14 which are fed to the reference generator 22 as shall be described in further detail.

*Operation of balancing apparatus*

The operation of the balancing apparatus of FIG. 1 will now be described, the operation being best understood by reference to the vector analysis of FIG. 2. The front and rear pickups 12 and 14 are mounted in engagement with the engine block adjacent the front and rear bearings, and a reference mark 106 is applied to a rotor on the crankshaft at a position observable under the illumination of both stroboscopic lamps 92 and 100. Since the stroboscopic lamps 92 and 100 produce light of different colors, the mark 106 which is preferably white in color, may appear "frozen" under the influence of the white stroboscopic lamp 92 independently of the red lamp 100 and vice versa. That is, a white and a red mark will be visually observed when the engine is rotated, each mark being adjustable in angular position independently of the other as will hereinafter be seen. When the one colored mark is being used during the balancing operation, the other may visually vacillate randomly around the rotor and may be ignored.

The forces causing unbalance at the front and rear planes of the engine 10 may best be understood by reference to FIG. 2 (condition I). In the front plane there is a force vector $U_F$ due to the actual unbalance in the front plane. In addition, there is a second vector $CE_R$ due to the cross-effect from the actual unbalance of the rear plane. The total unbalance in the front plane $TU_F$ is, therefore, the resultant of the unbalance force at the front plane $U_F$ and the cross-effect $CE_R$ from the rear plane. In a similar manner, in the rear plane, there is a force vector $U_R$ due to the actual unbalance in the rear plane together with a vector $CE_F$ due to the cross-effect from the actual unbalance of the front plane. The total unbalance force $TU_R$ in the rear plane is the resultant of these. If an attempt were made to balance the engine without eliminating cross-effect, it would still remain unbalanced due to the fact that the balancing equipment is always actuated by the resultant vectors $TU_F$ and $TU_R$. The true unbalance vectors $U_F$ and $U_R$ in the front and rear planes cannot be detected directly.

In order to eliminate cross-effect, the engine 10 is initially started. The balancing operation is carried out as the rotary switch A is rotated through its ten positions starting with position one. Before the balancing operation is started, the potentiometers 52 and 54 are adjusted such that the outputs of the plane separators 48 and 50 are grounded and apply substantially no signals to the front and rear isolators and mixers 16 and 18. As the engine rotates, both pickups 12 and 14 produce vibration signals, and the signal from the front pickup 12 is fed through the first contact of deck A–1 of the rotary switch A and through movable arm 20 to the reference generator 22. The pushbutton switch 82 is now depressed, thereby connecting the output of the reference generator 22 to the front strob circuit 90, to control the white stroboscopic lamp 92. At the same time, the red stroboscopic lamp 100 will be actuated, but the mark which appears red may be ignored. The amplitude meters 96 and 104 will also provide readings but these are of no significance. The phase adjuster 26 in the reference generator 22 is now adjusted such that the reference mark, appearing as white under the influence of lamp 92, will be "frozen" at any convenient position. As an example, "high-noon" may be utilized as an easily remembered and easily reproducible position (i.e., where the white index mark 106 appears at the top of the crankshaft). The pushbutton switch 82 is now released, thereby disconnecting the reference generator 22 from the front strob circuit 90. The front pickup 12, however, now feeds a signal through the front isolator and mixer 16, front calibration circuit 68, filter 83, front phase correction circuit 84 and contacts 80 of pushbutton switch 82 to the front strob circuit 90 and the stroboscopic lamp 92. The reference generator 22 simultaneously feeds a signal through front compensator 36 to the front isolator and mixer 16. Thus, the signal actuating the white stroboscopic lamp 92 is a composite of the signal from the reference generator 22 and the signal from the front pickup 12.

The front calibration circuit 68 through which the mixer signal passes is set with its amplitude control 70 at maximum gain. It will be recognized that no quantitative scale markings need be provided to set up this condition since it is created by adjustment of the controls to their internal limits. The front compensator 36 is now adjusted in phase and amplitude to provide a null on the amplitude meter 96. When this occurs, the output of the front compensator 36 constitutes a signal equal in amplitude and opposite in phase to that produced by the front pickup 12 so that from an electrical standpoint, the lamp 92 and meter 96 indicate a condition of minimum unbalance at the position of the front pickup.

The selector switch A is now turned to position two. The rear pickup 14 now feeds a signal through the rear isolator and mixer 18 to the rear calibration circuit 71. The rear isolator and mixer 18 at the same time receives a signal from the rear compensator 38 (which signal originates in the reference generator 22). Now, the rear calibration circuit 71 has its amplitude control 74 set to maximum gain and its phase control 76 set to zero phase shift. The rear compensator circuit 38 is now adjusted both in phase and amplitude to null the amplitude meter 104 whereupon, from an electrical standpoint, the rear pickup 14 detects a balanced condition. The engine is now stopped and it will be clear that, electrically speaking, a balanced rotor is simulated by the settings which exist in the controls of the front and rear compensator circuits 36 and 38. These settings need not be quantitatively noted but simply allowed to remain as they are. The electrically balanced condition is illustrated by condition II in FIG. 2. In this condition, the front compensator 36 has been adjusted in phase and amplitude to produce a signal which, vectorially, is equal in amplitude to a signal proportional to $TU_F$ but 180° out of phase with $TU_F$. When this signal from circuit 36 is mixed with the signal $TU_F$ from pickup 12 in isolator and mixer 16, complete signal cancellation occurs. The same occurs in isolator and mixer 18. That is, a signal from compensator 38 equal in amplitude but 180° out of phase with the signal proportional to $TU_R$ from pickup 14 provides complete signal cancellation at the output of circuit 18.

The switch A is now rotated to position three. A known weight is attached to the flywheel of the engine 10 in the angular position of the reference mark at the rear of the engine. Thereafter, the engine is started and the pushbutton 82 depressed, whereupon the white stroboscopic lamp 92 is energized by the reference generator 22 in the following manner. The rear pickup 14 feeds an input to the reference generator 22 through contact 3 of deck A–1 and movable arm 20. The reference generator 22 feeds an output to the white stroboscopic lamp 92. The phase adjuster 26 in the reference generator 22 is now adjusted to bring the rotor white reference mark back to the previously established high-noon position under the illumination of the white stroboscopic lamp 92. This produces a condition (condition III in FIG. 2) wherein an unbalance force $TW_R$ is produced by the trial weight in the rear plane, and the cross-effect produces an unbalance force $CE_{TW_R}$ in the front plane. As previously stated, the reading of the amplitude meter 96 is of no significance at this time.

It will be noted that at this time the reference generator 22 is being actuated by the rear pickup 14 in contrast to its prior actuation by the front pickup 12 when the selector switch A was in positions one and two. This makes no difference, however, since the reference generator 22 always produces an output of fixed amplitude and its phase has been adjusted to again coincide with that which was initially established.

The selector switch A is now turned to position four. At this time, the reference generator 22 is energized by the rear pickup 14 and through contact 4 of deck A–1 and movable arm 20 and feeds its signal of known amplitude and phase to the front and rear compensator circuits 36 and 38. Since both the front and rear compensators 36 and 38 have been previously adjusted to simulate an electrically balanced rotor under the energization of the signal from the reference generator 22, the output signal received by the front meter 96, for example, constitutes a cross-effect signal produced by the addition of the known weight to the rear of the engine adjacent the rear pickup 14.

At this time, potentiometer 54 is adjusted such that the front plane separator 50 will receive from the rear pickup 14 through the rear isolator and mixer 18 a signal which is produced by the known weight at the rear of the engine. The output of the front plane separator 50 is, in turn, fed to the front isolator and mixer 16 where it is mixed with the cross-effect signal from the front pickup 12. The front plane separator 50 is now adjusted both in amplitude and phase to null the amplitude reading on meter 96 to thereby cancel the cross-effect at the front of the engine produced by the weight at the rear of the engine (condition IV in FIG. 2). The front plane separator 50 is now set up and need not be readjusted nor need any quantitative readings of its control knobs be noted or recorded. Even though the trial weight be removed from the rear plane, or a different trial weight added, the front cross-effect will still be canceled since circuit 50 produces a signal proportional to the unbalance in the rear plane, this signal being always equal in amplitude, and opposite in phase, to the cross-effect signal.

The selector switch A is now turned to position five. The reference generator 22 continues to be activated by the rear pickup 14 and continues to feed a signal to both the front and rear compensator circuits 36 and 38 so that a balanced rotor is simulated except for the signal produced by the known weight at the rear of the engine. At this time, the red stroboscopic lamp 100 is still energized by the signal produced by the known weight at the rear of the engine from the rear isolator and mixer 18, rear calibration circuit 71, filter 87, rear phase correction circuit 88 and rear strob circuit 98. Since an electrically balanced rotor has been simulated, the signal activating the red stroboscopic lamp 100 is produced solely by the known weight introduced at the rear of the engine. The phase control 76 in the rear calibration circuit 71 is now adjusted to cause the red reference mark on the rotor to appear at any desired position, say twelve o'clock or high-noon, under the illumination of the red stroboscopic lamp 100, and the amplitude control 74 in the rear calibration circuit 71 is adjusted to get a direct reading on the amplitude meter 104 in terms of the known weight introduced into the rear plane of the engine 10. That is to say, if the known weight was two ounces and radially spaced two inches from the axis of the crankshaft, the amplitude control 74 may be adjusted until the meter 104 reads four ounce-inches, whereupon the meter will give a direct reading. The adjustment of the calibration circuit phase control 76 has produced a zero lag or lead angle so that the phase indication is also a direct reading. The engine is now stopped.

The selector switch A is turned to position six. The known weight is removed from the rear of the engine adjacent the rear pickup 14 and is placed on the rotor or crankshaft at the forward end of the engine adjacent to the front pickup 12. The known weight is attached to the forward end of the crankshaft in the angular position of the reference mark. Thereafter, the engine is started and the front pickup 12 feeds an input to the reference generator 22 through contact 6 of deck A–1 and movable arm 20. At the same time, the pushbutton 82 is depressed whereupon the white stroboscopic lamp 92 is energized by the reference generator 22. The phase adjuster 26 in the reference generator 22 is now adjusted to bring the rotor white reference mark back to the previously established high-noon position under the illumination of the white stroboscopic lamp 92. Although the white lamp 92 is not used to balance the rear plane of the engine, the amplitude of the signal from the reference generator 22 is fixed, and the adjustment of the phase by adjuster 26 simply provides the reference voltage to be fed to the front and rear compensators 36 and 38, respectively, in order to simulate a balance rotor. Since this phase adjustment is the same for both the front and rear planes, the white stroboscopic lamp 92 is conveniently used initially for rear plane separation as it was in the case of front plane separation. The addition of the known weight to the front of the engine produces a condition illustrated as condition V in FIG. 2 wherein the unbalanced force $TW_F$ is produced by the trial weight in the front plane, and the cross-effect produces an unbalanced force $CE_{TWF}$ in the rear plane.

The selector switch A is now turned to position seven. At this time, the reference generator 22 is energized by the front pickup 12 and through contact 7 of deck A-1 and movable arm 20 and feeds its signal of known amplitude and phase to the front and rear compensator circuits 36 and 38. Since both the front and rear compensators 36 and 38 have been previously adjusted to simulate an electrically balanced rotor under the energization of the signal from the reference generator 22, the output signal received by the stroboscopic lamp 100 constitutes a cross-effect signal produced by the addition of the known weight at the front of the engine adjacent the front pickup 12.

At this time, potentiometer 52 is adjusted such that the rear plane separator 48 will receive from the front pickup 12 through the front isolator and mixer 16 a signal which is produced by the known weight at the front of the engine. The output of the rear plane separator 48 is, in turn, fed to the rear isolator and mixer 18 where it is mixed with the cross-effect signal from the rear pickup 14. The rear plane separator 48 is now adjusted both in amplitude and phase to null the amplitude reading on meter 104 to thereby cancel the cross-effect at the rear of the engine produced by the weight at the front of the engine (condition VI in FIG. 2). The rear plane separator 48 is now set up as was the front plane separator 50 and need not be readjusted.

The selector switch A is now turned to position eight. The reference generator 22 continues to be activated by the front pickup 12 and continues to feed signal to both the front and rear compensator circuits 36 and 38 so that a balanced rotor is simulated except for the signal produced by the known weight at the front of the engine. At this time, the white stroboscopic lamp 98 is energized by the signal produced by the known weight at the front of the engine from the front isolator and mixer 16, from calibration circuit 68, filter 83, front phase correction circuit 84 and front strob circuit 90 through contacts 80 on pushbutton switch 82. Since an electrically balanced rotor has been simulated, the signal activating the white stroboscopic lamp 92 is produced solely by the known weight introduced at the front of the engine. The phase control 72 in the front calibration circuit 68 is now adjusted to cause the white reference mark on the rotor to appear at any desired position, say twelve o'clock or high-noon, under the illumination of the white stroboscopic lamp 92, and the amplitude control 70 in the front calibration circuit 68 is adjusted to get a direct reading on the amplitude meter 96 in terms of the known weight introduced into the front plane of the motor. That is, if the known weight is again four ounce-inches, the amplitude control 70 may be adjusted until the meter 96 reads four ounce-inches, whereupon the meter will give a direct reading. The adjustment of the calibration circuit phase control 72 has produced a zero lag or lead angle so that the phase indication is also a direct reading. The engine is now stopped and the trial weight removed.

The selector switch A is now turned to either position nine or ten and the engine started, and since the cross-effect has been electrically eliminated, the front and rear amplitude meters 96 and 104 will give indications proportional to $U_F$ and $U_R$, respectively (condition VII in FIG. 2). These are the true unbalance forces at the front and rear of the engine, respectively. The white reference mark on the rotor at the front of the engine will now appear at, say, two o'clock while the red reference mark appears at, say, five o'clock.

The engine is now stopped, and in order to balance the front plane, the reference mark is rotated to the two o'clock position. Under these conditions, the heavy point at the front of the engine is directly at twelve o'clock or high-noon meaning that if two ounce-inches were indicated on the front meter 96, and amount of metal proportional to this figure will be removed at the twelve o'clock position, or a weight added at the six o'clock position proportional to this figure. In order to balance the rear plane of the engine, the reference mark at the front of the engine is rotated to the five o'clock position, whereupon the heavy point at the rear of the engine will be directly at twelve o'clock. If the rear meter 104, for example, indicates one ounce-inch, either an amount of metal proportional to this value may be removed at the twelve o'clock position or a weight added at the six o'clock position, the weight being proportional to one ounce-inch. At this point, the engine is now balanced, and if it is again started the meters 96 and 104 should both register zero.

Actually, once the balancing equipment has been calibrated and the cross-effect eliminated for a particular type of engine, it remains calibrated and need not be further calibrated for each engine balanced since the spring constants and other factors affecting the cross-effect in a particular engine design do not vary from unit to unit. This principle is more fully described in U.S. Patent No. 3,030,813, assigned to the assignee of the present invention. Therefore, once the apparatus has been calibrated, the selector switch A can remain on either contact 9 or 10, the particular engine under test started, and the positions of the red and white marks on the rotor observed as well as the readings on meters 96 and 104 to select the proper weight addition or subtraction at the front and rear of a particular engine and its location with respect to the reference mark. The reason for two contact points 9 and 10, both connected to ground, is that in certain cases where a single strob lamp is used rather than two, a different position of a gang switch will be required for front and rear balancing. This same type of switch is conveniently used in the present invention.

*Detailed description of circuit components of balancing apparatus*

Figure 3A:
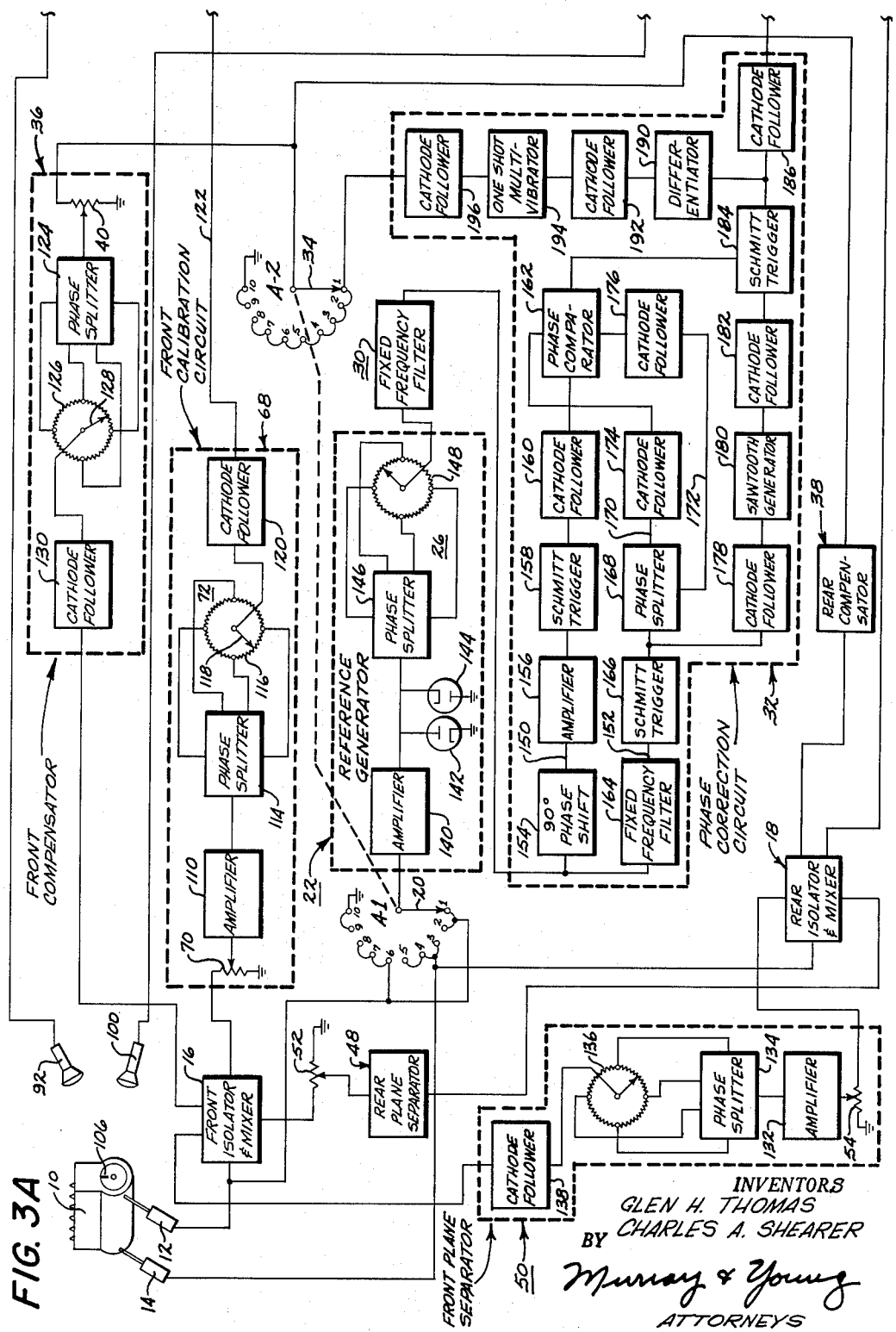

Referring now to FIG. 3, elements which correspond to those shown in FIG. 1 are indicated by like reference numerals. The front calibration circuit 68, for example, includes a potentiometer which corresponds to the amplitude control 70 shown in FIG. 1. The output of the potentiometer is applied through amplifier 110 to the phase adjust 72. The phase adjust comprises a phase splitter 114 adapted to produce four output signals 90° out of phase with respect to each other. These signals are applied at points around a circular potentiometer 116 which are spaced 90° apart such that by turning the contact or pointer 118 the output signal may be made to vary through 360°. This output signal is applied through a cathode follower 120 and lead 122 to the front filter 83. The rear calibration circuit 71 is identical to the front calibration circuit 68 already described.

The front compensator circuit 36 includes a potentiometer 40 corresponding to the amount control shown in FIG. 1. The output of this potentiometer is applied to a phase splitter 124 similar to the phase splitter 114 already described. The outputs of the phase splitter 124 are applied around the periphery of a potentiometer 126 and spaced 90° apart such that by rotating the pointer or contact 128 on the potentiometer, the phase of the output signal therefrom may be made to vary through 360°. This output signal is applied through cathode follower 130 to the front isolator and mixer 16. The rear compensator 38 is identical to front compensator 36 and need not be further described in detail.

The front and rear plane separators 48 and 50 are identical in construction, only the front plane separator being shown in detail. From the potentiometer 54, the signal from the rear isolator and mixer 18 passes through an amplifier 132 to a phase splitter 134 similar to the phase splitters 114 and 124 already described. The four output signals from the phase splitter 134 are applied to a circular potentiometer 136, the output of which is applied through cathode follower 138 to the front isolator and mixer 16.

The reference generator 22 includes an amplifier 140, the output of which is applied to a limiter comprising a pair of reversed diodes 142 and 144 connected to ground. The output of the limiter is applied to a phase splitter 146, this phase splitter being adapted to produce four output signals each 90° out of phase with respect to each other. The output signals from phase splitter 146 are connected around the circular potentiometer 148 in the manner already described, the combination of elements 146 and 148 comprising the phase adjust 26 for the reference generator.

The output of potentiometer 148 is applied to the fixed frequency filter 30 which is of the bandpass type in that it will pass a narrow band of frequencies while rejecting all others. As was mentioned above, it often happens that two or more sources of unbalance are present in the engine 10 and are generating vibrations at different frequencies with the result that a composite electrical signal composed of several different frequencies is produced by the pickups 12 and 14. Consequently, it becomes necessary to employ the filter 30 which will separate a particular frequency from the different frequencies such that the stroboscopic lamps 92 and 100 will fire at the frequency of only one vibration. Furthermore, in the case of an internal combustion engine, there may not only be several sources of unbalance; but, in addition, the speed of rotation of the various parts of the engine cannot be accurately controlled with the result that the frequency of the alternating current signal passing through the filter 30 will also vary. Since a phase shift occurs in a signal of varying frequency passing through a filter, the phase of the signal used to fire the stroboscopic lamps 92 and 100 will also vary, meaning that in the absence of some type of phase correcting means, the stroboscopic lamps cannot be used to accurately balance the equipment.

For this purpose, the phase correction circuits 32, 84 and 88 are employed. With respect to the phase correction circuit 32, it includes two signal channels generally indicated at 150 and 152. In signal channel 150, the phase of the signal at the output of filter 30 is first shifted in phase by 90° in a phase shift circuit 154 and thereafter passes through an amplifier 156 to a Schmitt trigger multivibrator circuit 158 which converts the sine wave output from amplifier 156 into a generally symmetrical square-wave signal having a frequency equal to that of the alternating current signal passing through the filter 30. From circuit 158, the square-wave signal passes through a cathode follower circuit 160 to a phase comparator 162, the details of which may be had by reference to our copending application Serial No. 196,351, filed on even date herewith and assigned to the assignee of the present application.

Reverting now to the signal channel 152, it includes a second fixed frequency filter 164 which is tuned to the same frequency as filter 30. From filter 164, the signal passes through a Schmitt trigger multivibrator circuit 166 where it is converted into a symmetrical square-wave signal having a frequency equal to that of the alternating current signal at the output of filter 164. From Schmitt trigger multivibrator circuit 166, the signal is applied to a phase splitter 168 which, in its simplest form, comprises a vacuum tube in which the input is applied to a control grid and two outputs are taken from the anode and cathode, respectively, whereby square-wave signals 180° out of phase with respect to each other will appear on leads 170 and 172. These signals are passed through cathode followers 174 and 176, respectively, to the phase comparator circuit 162.

The output of Schmitt trigger circuit 166, in addition to being applied to the phase splitter circuit 168, is also applied through cathode follower 178 to a sawtooth generator 180. The sawtooth output wave form from generator 180 is then applied through cathode follower 182 to Schmitt trigger circuit 184. The output of the phase comparator circuit 162 is also applied to the Schmitt trigger circuit 184, and the output of this latter circuit 184 is adapted to be applied through cathode follower 186 and lead 188 to the front strob circuit 90 through normally open contacts 86 on pushbutton switch 82. The output of the Schmitt trigger circuit 184 is also applied through differentiator 190 and cathode follower 192 to a one-shot multivibrator 194. The output of the one-shot multivibrator 194, after passing through cathode follower 196 is that signal from the phase correction circuit 32 which is applied through deck A–2 to the front and rear compensators 36 and 38, respectively.

Figure 3B:
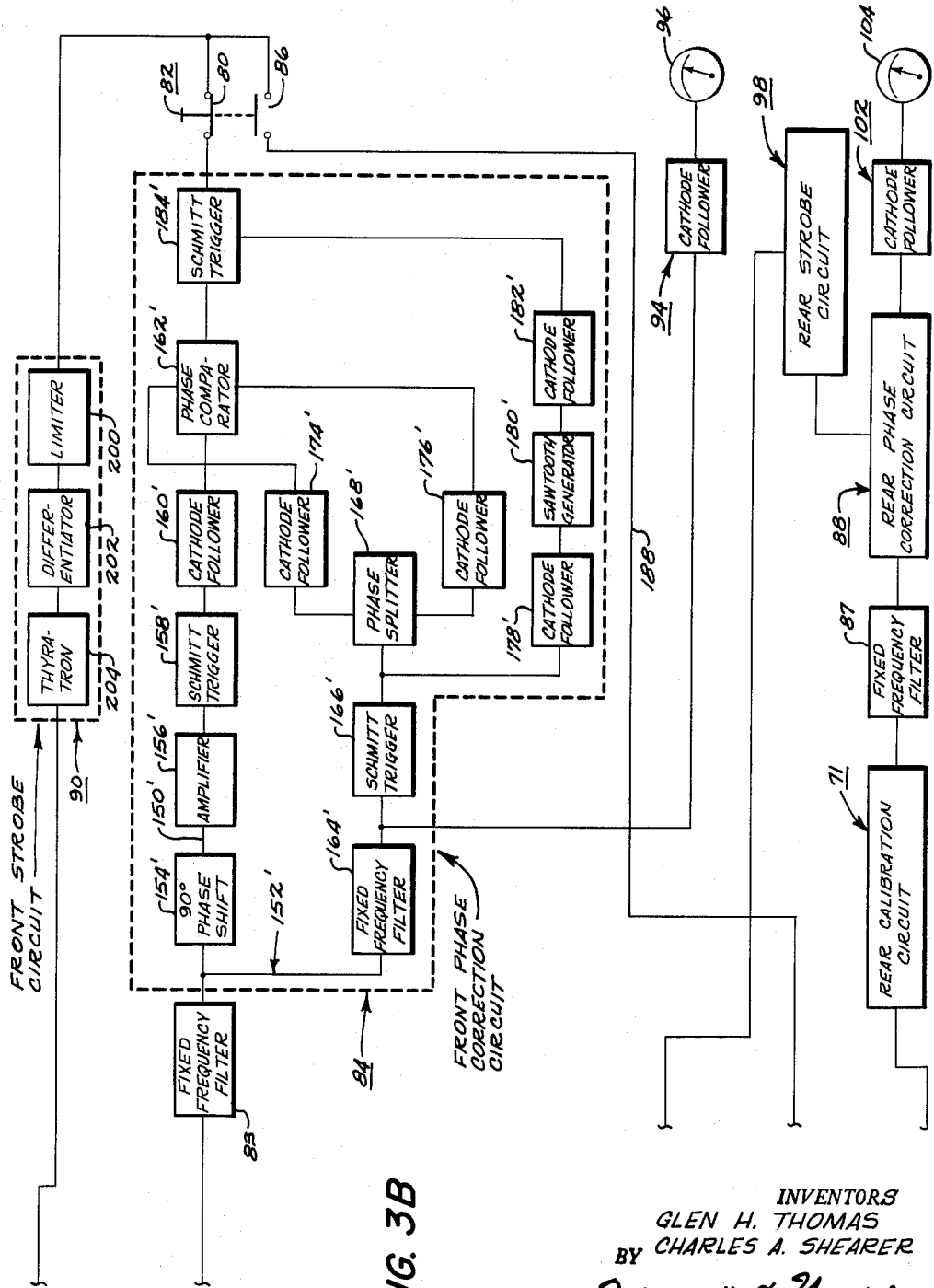

With reference to the front phase correction circuit 84 shown in FIG. 3B, it is very similar to the phase correction circuit 32 already described. The output of filter 83 is divided into two channels 150' and 152'. Channel 150' includes a 90° phase shift circuit 154', an amplifier 156', a Schmitt trigger circuit 158' and a cathode follower 160'. Channel 152' includes a second fixed frequency filter 164', a Schmitt trigger circuit 166' and a phase splitter 168', the phase splitter being adapted to produce output signals 180° out of phase with respect to each other which are applied through cathode followers 174' and 176' to a phase comparator 162' which also receives the output of cathode follower 160'.

Also connected to the output of Schmitt trigger circuit 166' is a cathode follower 178', a sawtooth generator 180' and a cathode follower 182'. The output of cathode follower 182' is applied to a Schmitt trigger circuit 184' together with the output of the phase comparator 162'. The output of the Schmitt trigger circuit 184', in turn, is that signal which is applied through the normally closed contacts 80 of pushbutton switch 82 to the front strob circuit 90.

The output of the frequency filter 164' is also applied through the cathode follower 94 to the amplitude meter 96, substantially as shown. The rear phase correction circuit 88 is substantially the same as the front phase correction circuit 84 already described and provides outputs which are applied to the rear strob circuit 98 and through the cathode follower 102 to the amplitude meter 104.

The front and rear strob circuits are substantially the same and each comprises a limiter circuit 200 and a differentiator 202, the output of the differentiator being applied to a thyratron 204. As is well known to those skilled in the art, the differentiator is a circuit in which voltage amplitude at the output is proportional at any instant to the rate of change of voltage amplitude at the input. The voltage wave form appearing at the output of differentiator 202 will, therefore, be a series of sharp voltage pulses which occur in time at the points where the input signal changes from one voltage level to another. As the voltage changes in a positive direction, a sharp positive pulse is produced by the differentiator, these sharp pulses occurring at the leading edges of square-wave output signals from the Schmitt trigger circuit 184'. The sharp pulses are, in turn, used to fire the thyratron 204, the output of the thyratron being used to periodically fire the stroboscopic lamp 92 which will cause the mark 106 on the engine crankshaft to appear stationary when the firing rate of the stroboscopic lamp is equal to the rotational speed of the crankshaft. The rear strob circuit 98 operates in the same manner as circuit 90 and cause the red stroboscopic lamp 100 to periodically fire.

*Operation of phase correction circuits*

Operation of the phase correction circuits 32, 84 and 88 may best be understood by reference to the wave forms shown in FIG. 4. The shape of the wave forms for the case where the vibrational frequency is exactly equal to the tuned frequency of filters 30, 83 and 87 is illustrated by the solid lines in FIG. 4; whereas the shape of the wave forms occuring when the vibrational frequency varies slightly from the tuned frequency of the filters is shown by the dotted lines.

In explaining the operation of the phase correction circuits, the circuit 32 will be considered first. Taking the case where the fundamental vibration frequency is exactly equal to the tuned frequency of filter 30, the fundamental wave form A applied through the filter 30 will appear substantially as a sine wave. After passing through filter 30, the fundamental wave form B is still a sine wave which has not been shifted in phase with respect to the original wave form A since no phase shift is effected in the signal when it is exactly at the frequency to which the filter 30 is tuned. After the signal passes through the 90° phase shift circuit 154, however, it will appear as wave form C in FIG. 4 where the sine wave has been advanced by 90°. This wave form (i.e., wave form C), after passing through the Schmitt trigger circuit 158, will appear as wave form D wherein a symmetrical square-wave signal is produced having a frequency equal to that of the original wave form A but shifted in phase with respect to wave form A by 90°. It is this signal which is applied to the phase comparator circuit 162 from the cathode follower 160.

As was mentioned above, the wave form B is also applied to channel 152 where it passes through fixed frequency filter 164. For the case assumed where no phase shift occurs in passing through filter 30, no phase shift will occur in filter 164 either since it is tuned to the same frequency as filter 30. Consequently, the wave form E appearing at the output of filter 164 will be a sine wave which is locked in phase with respect to the original sine wave A. This signal, after passing through the Schmitt trigger multivibrator circuit 166 and phase splitter 168 produces two square-wave signals F and G which are shifted in phase with respect to each other by 180°. The square-wave signal F, it will be noted, is symmetrical and also locked in phase with respect to original wave form A.

The output of the Schmitt trigger circuit 166, after being applied to the sawtooth generator 180 from cathode follower 178, will appear as wave form H which comprises a sawtooth having a frequency equal to the frequency of the input signal applied to filter 30. This sawtooth wave form is applied through the cathode follower 182 to the Schmitt trigger circuit 184; and since the Schmitt trigger is a circuit which will change from one stable state to the other whenever the input voltage applied thereto exceeds a predetermined voltage level, the output of the Schmitt trigger 184 is a square-wave signal appearing as wave form J. The output of the phase comparator 162, however, is also applied to the Schmitt trigger circuit 184 so that it affects the point on the voltage rise of the sawtooth wave form where the Schmitt trigger circuit 184 will fire to produce a square-wave output. By reference to our above-mentioned copending application Serial No. 196,351, it will be understood that the phase comparator 162 will produce a resultant direct current output voltage which has one polarity when the input signal applied to filter 30 is above the fundamental frequency to which the filter is tuned and a resultant direct current voltage of the other polarity when the frequency of the signal applied to the filter 30 is beneath the fundamental frequency. In wave form H in FIG. 4, the normal or quiescent firing level of the Schmitt trigger circuit 184 (i.e., the point at which it changes from one stable state to the other) is indicated by level 116. Thus, the Schmitt trigger multi-vibrator 184 will fire at approximately 180° and 540° to produce wave form J which may be applied through cathode follower 186, lead 188, contacts 86 and limiter 200 to the differentiator 202. The output of the differentiator 202, in turn, will appear as wave form K and comprises a series of sharp voltage spikes which occur at the 180° and 540° marks for the example given.

Reverting again to the wave form A, when the frequency of the input signal has shifted slightly from that to which the filter 30 is tuned, it may appear as the dotted outline in FIG. 4. After passing through the filter 30, it will be shifted in phase (for example, by 45°), and will appear as wave form B. That is, it will lag the original wave form A by 45°. After passing through the 90° phase shift circuit 154, however, it will appear as wave form C wherein it leads the original wave form A by 45°. This signal, in turn, is used to fire the Schmitt trigger multivibrator 30 which produces the dotted line wave form D as shown. The dotted line wave form B after passing through the filter 164 will appear as wave form E wherein a second phase shift of 45° is effected so that the dotted line wave form E now lags the original dotted line wave form A by 90°. This wave form E produces the dotted line wave forms F and G which, when applied to phase comparator 162 in combination with dotted line wave form D will produce a positive direct current output voltage from the circuit 162. This positive direct current voltage shifts the firing level 116 upwardly to level 116′ as shown by the wave form H. At the same time, since the sawtooth wave form at the output of cathode follower 182 is locked in phase with respect to the dotted line wave form E, it is shifted by 90° from the original dotted line wave form A. Since the firing level 116′, however, has been shifted upwardly, the Schmitt trigger circuit 184 still fires or changes stable states at 180° and 540° as in the previous case with the result that the positive spiked pulses in wave form K which are used to fire thyratron 204 have the same phase relationship with respect to the original alternating current signal A as they did in the case where no phase shift occurred in the signal in passing through filters 30 and 164.

It will be noted that the square-wave pulses in wave form J at the output of the Schmitt trigger circuit 184 will vary in width, depending upon the frequency of the input signal applied to filter 30. For the purpose of firing the stroboscopic lamps 92 and 100, however, this makes little difference since it is only the forward edge of the square-wave pulses which are employed for the purpose of firing the lamps. The signal from the phase correction circuit 32 applied to the front and rear compensators 36 and 38, respectively, must be mixed with the input signal from pickups 12 and 14 in front and rear isolators and mixers 16 and 18, respectively. Consequently, these signals (i.e., those applied to circuits 36 and 38) must be symmetrical. For this purpose, the differentiator 190, cathode follower 192 and one-shot multivibrator 194 are employed. The output of the differentiator 190 will appear substantially the same as wave form K wherein pulses are produced at 180° and 540°. This signal, after passing through the cathode follower 192, is applied to the one-shot multivibrator 194. As is well known to those skilled in the art, a one-shot multivibrator is a circuit for producing a square-wave output signal of fixed pulse width in response to an input signal applied thereto. Consequently, the one-shot multivibrator 194 will be triggered in response to each positive spiked pulse in wave form K to produce wave form L wherein each square-wave pulse is of the same width and the wave form is symmetrical. It is this signal (i.e., wave form L) which is applied to the front and rear compensators 36 and 38 for the purpose of electrically balancing the engine during the calibration step.

The operation of the front phase correction circuit 84 and the rear phase correction circuit 88 is substantially the same as circuit 32, except that in this case the output of Schmitt trigger 184′, for example, is applied directly to the front strob circuit without the necessity for reforming the square-wave output of the Schmitt trigger 184′ since it is only the leading edges of the square-wave signals from circuit 184′ which are used to fire the lamp 92. The same, of course, applies to the rear phase correction circuit 88.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In balancing apparatus adapted to be connected to be a pair of electromechanical transducers for two plane balancing of a rotating member, a reference generator connectable to at least one of said transducers to be energized thereby to produce a reference signal of fixed amplitude and adjustable phase, filter means connected to the output of said reference generator for eliminating all signals other than those due to a single rotating member while producing an output signal which is locked in phase to the input signal applied thereto regardless of the frequency of the input signal, a pair of compensators capable of adjusting the phase and amplitude of a signal fed thereto, a pair of mixers for mixing the outputs of said transducers and the outputs of said compensators, means for connecting said filter means to the compensators, and means for connecting one compensator and one transducer to one of the mixers while connecting the other of the compensators and the other transducer to the other mixer to produce output signals from the mixers which simulate those obtained from a balanced member.

2. In balancing apparatus adapted to be connected to a pair of electromechanical transducers for two plane balancing of a rotating member of substantially continually varying rotational speed, a reference generator connectable to at least one of said transducers to be energized thereby to produce a reference signal of fixed amplitude and adjustable phase, bandpass filter means connected to the output of said reference generator for eliminating all signals other than those due to a single rotating member, phase correcting means connected to the output of said filter means for automatically and instantaneously correcting a shift in phase occasioned by a variable input signal passing through the filter means due to a variation in the rotational speed of said member, a pair of compensators capable of adjusting the phase and amplitude of a signal fed thereto, a pair of mixers for mixing the outputs of said transducers and the outputs of said compensators, means for connecting said phase correcting means to the compensators, and means for connecting one of the compensators and one of the transducers to one of the mixers while connecting the other of the compensators and the other transducer to the other mixer to produce output signals from the mixers which simulate those obtained from a balanced member.

3. In balancing apparatus adapted to be connected to a pair of electromechanical transducers for two plane balancing of a rotating member of substantially continually varying rotational speed, the combination of means for simulating signals obtained from a balanced member including a reference generator connectable to at least one of said transducers to be energized thereby to produce a reference signal of fixed amplitude and adjustable phase, bandpass filter means connected to the output of said reference generator for eliminating all signals other than those due to a single rotating member, and phase correcting means connected to the output of said filter means for automatically and instantaneously correcting a shift in phase occasioned by a variable input signal passing through the filter means due to a variation in the rotational speed of said member.

4. In balancing apparatus adapted to be connected to a pair of electromechanical transducers for two plane balancing of a rotating member of variable rotational speed, the combination of means for producing output signals which simulate those obtained from a balanced member including a reference generator connectable to at least one of said transducers to be energized thereby to produce a reference signal of fixed amplitude and adjustable phase, bandpass filter means connected to the output of said reference generator for eliminating all signals other than those due to a single rotating member, and phase correcting means connected to the output of said filter means for correcting a shift in phase occasioned by a variable input signal passing through the filter means due to a variation in the rotational speed of said member, said phase correcting means comprising a pair of signal channels coupled to the output of said bandpass filter means, means in one of said channels for producing a first square-wave signal, means in the second channel for producing second and third square-wave signals each having a specified phase relationship with respect to said first square-wave signal, and means responsive to said first, second and third square-wave signals for producing a pulsed signal having a frequency corresponding to said reference signal with the pulses in said pulsed signal being fixed in phase with respect to said reference signal regardless of variations in the frequency of the reference signal.

5. In balancing apparatus adapted to be connected to a pair of electromechanical transducers for two plane balancing of a rotating member of variable rotational speed, the combination of means for producing output signals which simulate those produced by the transducers from a balanced member including a reference generator connectable to at least one of said transducers to be energized thereby to produce a reference signal of fixed amplitude and adjustable phase, bandpass filter means connected to the output of said reference generator for eliminating all signals other than those due to a single rotating member, phase correcting means connected to the output of said filter means for correcting a shift in phase occasioned by a variable input signal passing through the filter means due to a variation in the rotational speed of said member, said phase correcting means being adapted to produce a square-wave output signal in which the leading edge of each square-wave pulse is fixed in phase with respect to said reference signal but in which the width of the square-wave pulses vary as a function of the frequency of said reference signal, and means responsive to said square-wave output signal from the phase correcting means for producing a symmetrical square-wave signal in which the width of each square-wave pulse is the same and the leading edge of each pulse coincides with the leading edge of a corresponding pulse at the output of said phase correcting means.

6. The combination of claim 5 wherein said last-mentioned means comprises a differentiator responsive to the output signals from said phase correcting means for producing a spiked pulse at the leading edge of each square-wave pulse at the output of the phase correcting means, and a one-shot multivibrator responsive to said spiked pulses for producing a symmetrical square-wave signal in which each square-wave pulse has the same width.

7. In balancing apparatus adapted to be connected to a pair of electromechanical transducers for two plane balancing of a rotating member of variable rotational speed, a reference generator connectable to at least one of said transducers to be energized thereby to produce a reference signal of fixed amplitude and adjustable phase, bandpass filter means connected to the output of said reference generator for eliminating all signals other than those due to a single rotating member, phase correcting means connected to the output of said filter means for correcting a shift in phase occasioned by a variable input signal passing through the filter means due to a variation in the rotational speed of said member, the output of said phase correcting means being a square-wave signal in which the width of the square-wave pulses vary as a function of the frequency of said reference signal but in which the leading edge of each pulse in the square-wave signal is fixed in phase with respect to the reference signal, means responsive to said last-mentioned square-wave signal for producing a symmetrical square-wave signal which is fixed in phase with respect to said reference signal, a pair of compensators capable of adjusting the phase and amplitude of a signal fed thereto, a pair of mixers for mixing the outputs of said transducers and the outputs of said compensators, means for applying said symmetrical square-wave signal to the compensators, and means for connecting one compensator and one transducer to one of the mixers while connecting the other compensator and the other transducer to the other of said mixers to produce output signals from the mixers which simulate those obtained from a balanced member.

8. In balancing apparatus adapted to be connected to a pair of electromechanical transducers for two plane balancing of a rotating member of variable rotational speed, a pair of plane separators for electrically eliminating cross-effect between the two planes, a reference generator energized by one of said transducers for producing electrical signals mixable with the outputs of said transducers to electrically simulate a balanced rotor, a first mixer for mixing the output of one of said transducers with the electrical signal produced by said reference generator and the signal produced by one of said plane separators, a second mixer for mixing the output of the other of said transducers with the electrical signal from said reference generator and the output of the other of said plane separators, bandpass filter means connected to the outputs of said mixers for eliminating all signals other than those due to a single rotating member, phase correcting means connected to the outputs of said filter means for correcting a shift in phase occasioned by a variable input signal passing through the filter means due to a variation in the rotational speed of said member, and stroboscopic lamp means responsive to output signals from phase correcting means.

9. In balancing apparatus adapted to be connected to a pair of electromechanical transducers for two plane balancing of a rotating member, a pair of plane separators for electrically eliminating cross-effect, a reference generator energized by one of said transducers for producing electrical signals mixable with the outputs of said pickups to electrically simulate a balanced rotor, bandpass filter means connected to the output of said reference generator for eliminating all signals other than those due to a single rotating member, phase correcting means connected to the output of said filter means for correcting a shift in phase occasioned by a variable input signal passing through the filter means due to a variation in the rotational speed of said member, a first mixer for mixing a signal from said reference generator with the output of one of said transducers and the output of one of said plane separators, a second mixer for mixing a signal from said reference generator with the output of the other of said tranducers and the output of the other plane separator, second bandpass filter means connected to the outputs of said mixers for eliminating all signals other than those due to a single rotating member, second phase correcting means connected to the outputs of said second filter means for correcting a shift in phase occasioned by a variable input signal passing through the second filter means due to a variation in the rotational speed of said member, and stroboscopic lamp means responsive to output signals from said second phase correcting means.

10. In balancing apparatus adapted to be connected to a pair of electromechanical transducers for two plane balancing of a rotating member of substantially continually varying rotational speed, a reference generator connectable to one of said transducers and adapted to produce a signal of predetermined amplitude and wave shape, bandpass filter means connected to the output of said reference generator for eliminating all signals other than those due to a single rotating member, phase correcting means connected to the output of said filter means for automatically and instantaneously correcting a shift in phase occasioned by a variable input signal passing through the filter means due to a variation in the rotational speed of said member, a pair of mixers connected to said transducers, and a pair of compensator circuits connected to said phase correcting means and said mixers for producing signals which will achieve substantially zero mixer output to thereby electrically simulate a balanced rotor.

11. In balancing apparatus adapted to be connected to a pair of electromechanical transducers for two plane balancing of a rotating member, a reference generator connectable to one of said transducers for producing a signal of predetermined amplitude and wave shape, bandpass filter means connected to the output of said reference generator for eliminating all signals other than those due to a single rotating member, phase correcting means connected to the output of said filter means for correcting a shift in phase occasioned by a variable input signal passing through the filter means due to a variation in the rotational speed of said member, the output of said phase correcting means comprising a square-wave signal in which the width of each square wave varies as a function of the speed of rotation of said member but the leading edge of each square wave is fixed in phase with respect to the signal applied to the reference generator, means responsive to said square-wave signal for producing a symmetrical square-wave signal which is fixed in phase with respect to the signal applied to said reference generator, a pair of mixers connected to the respective transducers, and a pair of compensator circuits responsive to said last-mentioned symmetrical square-wave signal and connected to said mixers for producing substantially zero mixer output to thereby electrically simulate a balanced rotor.

12. In balancing apparatus adapted to be connected to a pair of electrochemical transducers for two plane balancing of a rotating member having a variable rotational speed, stroboscopic lamp means for indicating the positional location of the unbalanced masses in the two planes, names for indicating the amount of the unbalanced masses in each plane, a pair of calibration circuits responsive to the signals produced by the respective transducers, each of said calibration circuits being capable of adjusting the amplitude and phase of signals fed thereto for calibrating the indications of said stroboscopic lamp means and said amount indicating means, bandpass filter means connected to the outputs of each of said calibration circuits for eliminating all signals other than those due to a single rotating member, phase correcting means connected to the output of said filter means coupled to each calibration circuit for correcting a shift in phase occasioned by a variable input signal passing through its associated filter means due to a variation in the rotational speed of said member, means coupling the output signals from said phase correcting means for each calibration circuit to said stroboscopic lamp means, and means for coupling the outputs of said bandpass filter means in each calibration circuit to said amount indicating means.

References Cited by the Examiner

UNITED STATES PATENTS

| | | | |
|---|---|---|---|
| 2,165,024 | 7/39 | Baker | 73—466 |
| 2,383,588 | 8/45 | Bousky | 73—466 |
| 2,805,576 | 9/57 | Rambo | 73—466 |
| 2,975,640 | 3/61 | Quell | 73—466 |
| 3,030,813 | 4/62 | Crawford | 73—466 |
| 3,077,781 | 2/63 | Silver | 73—465 |

RICHARD C. QUEISSER, *Primary Examiner.*

JOSEPH P. STRIZAK, *Examiner.*